Jan. 29, 1924.                                                1,482,217
              A. B. BROLUSKA
                TIRE STRUCTURE
           Filed April 7, 1923        3 Sheets-Sheet 1

INVENTOR.
AMEL B. BROLUSKA
BY
ATTORNEY.

Jan. 29, 1924.  A. B. BROLUSKA  1,482,217
TIRE STRUCTURE
Filed April 7, 1923    3 Sheets-Sheet 2

INVENTOR.
AMEL B. BROLUSKA
BY
ATTORNEY.

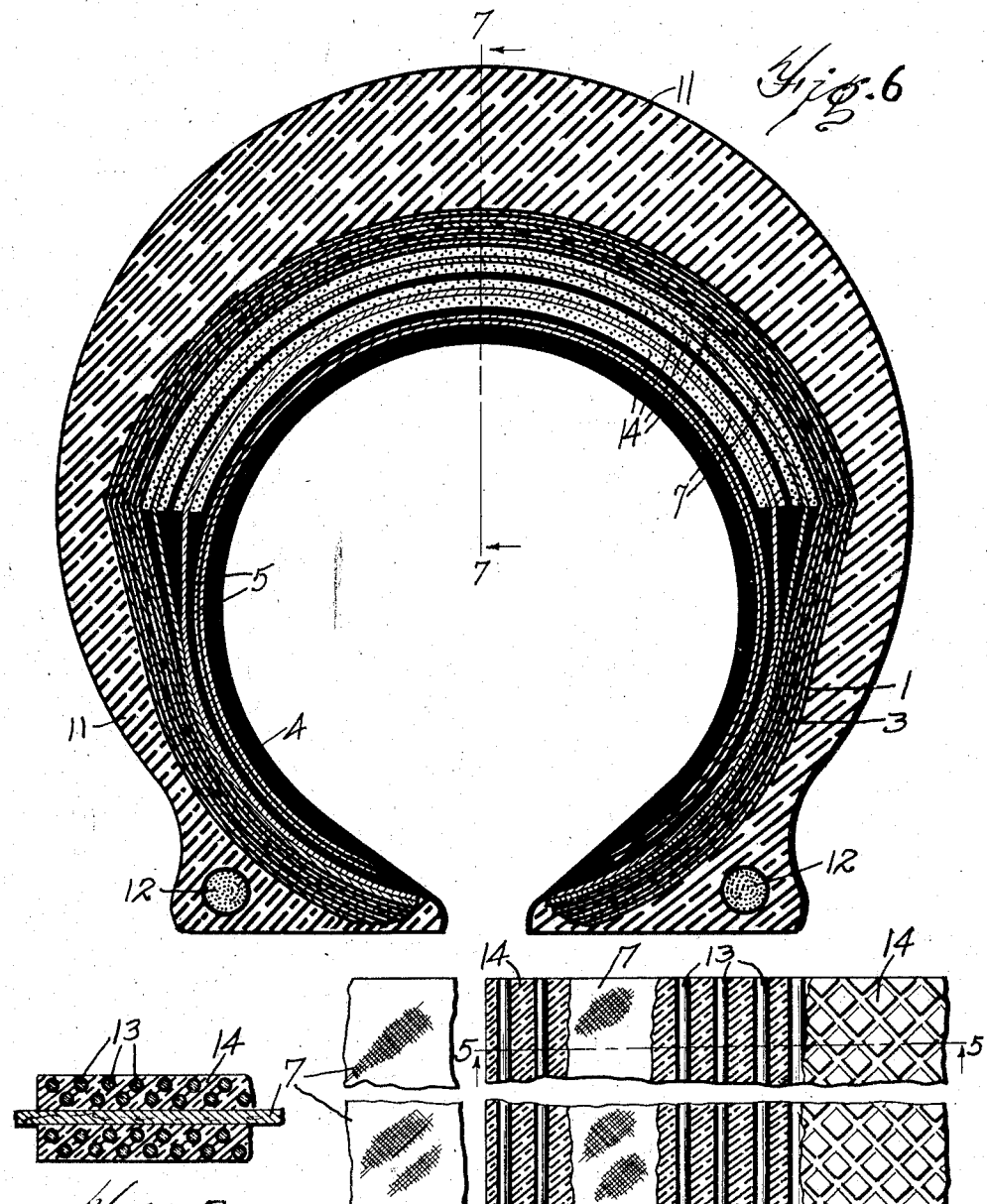

Patented Jan. 29, 1924.

1,482,217

UNITED STATES PATENT OFFICE.

AMEL B. BROLUSKA, OF DETROIT, MICHIGAN.

TIRE STRUCTURE.

Application filed April 7, 1923. Serial No. 630,495.

*To all whom it may concern:*

Be it known that I, AMEL B. BROLUSKA, a citizen of the United States, residing at Detroit, county of Wayne, State of Michigan, have invented a certain new and useful Improvement in Tire Structures; and declare the following to be a full, clear, and exact description of the same, such as will enable others skilled in the art to which it pertains to make and use the same, reference being had to the accompanying drawings, which form a part of this specification.

This invention relates to tire structures and the object of the invention is to provide a tire structure in which friction between the parts of the tire is prevented, providing a tire which will not heat through internal friction and thus decrease the life of the tire. In the usual tire construction the different layers of cord or fabric rub together due to the stress and strain imparted to the tire during travel and in moving over obstacles such as stones, rough roads, etc. The slight movement of the different layers of fabric caused in this manner produces heat within the tire due to the friction between the layers of cord or fabric and this heat and friction wears away the fabric and rubber within the tire and eventually results in the tire blowing out. The principal object of this invention is to provide a tire in which the different layers of fabric are separated by an elastic rubber base which is sufficiently flexible so that one layer of fabric may move in relation to the others without friction, the layers of rubber forming a cushion between the layers of fabric which is sufficiently flexible to allow any such movement of the fabric. Another object of the invention is to provide a tire built up from strips of fabric or cords laid diagonally across the tread of the tire, the strips of fabric or cords being separated on all sides from the next adjacent strip by a flexible rubber cushion. Another object of the invention is to provide a puncture proof tire formed from strips of a tough, flexible composition in which the fabric or cords are embedded the composition strips being vulcanized and being flexible so as to give with the fabric. Another object of the invention is to provide a series of puncture proof plates carried by the strips of cords or fabric having wires embedded therein so that a nail or the like on entering the tire is turned by the wires and cannot enter the interior of the casing. These objects and the several novel features of the invention are hereinafter more fully described and claimed and the preferred form of construction by which these objects are attained is shown in the accompanying drawings in which—

Fig. 4 is a similar view of another type of puncture proof strip.

Fig. 5 is a section taken on line 5—5 of Fig. 4.

Fig. 6 is a transverse section through the complete casing taken on line 6—6 of Fig. 1.

Figure 1:
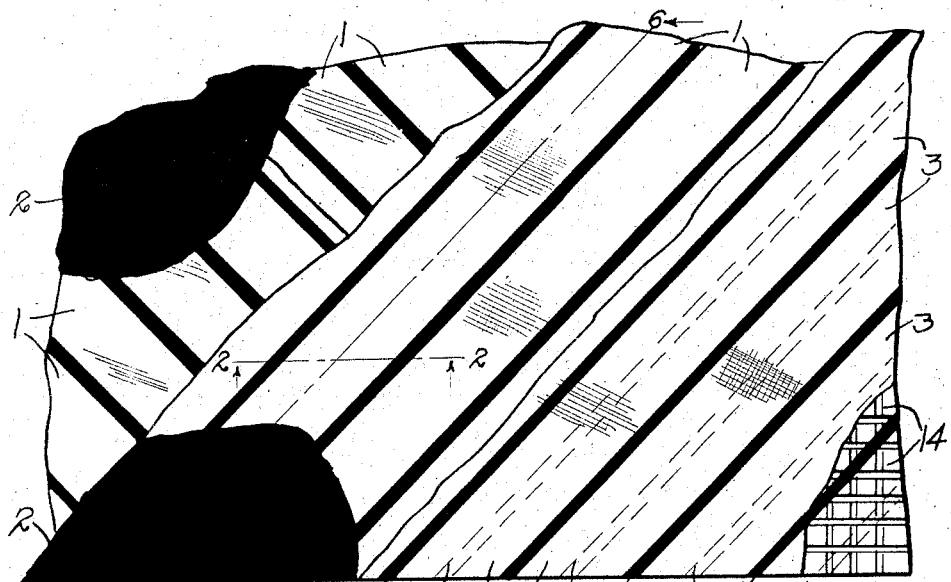
Fig. 1 is a view of the tire with the tread removed to show the position of the cord or fabric strips.
Figure 2:
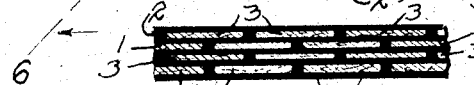
Fig. 2 is a section taken on line 2—2 of Fig. 1.
Figure 7:
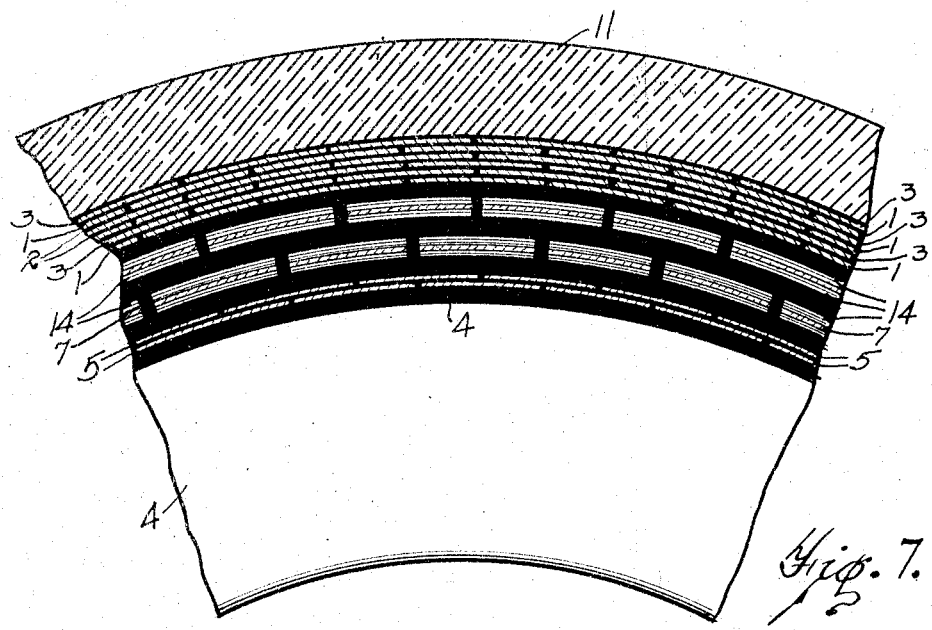
Fig. 7 is a section taken on line 7—7 of Fig. 5.

The tire is built up by means of strips of cord or fabric 1 which are laid diagonally across the tread of the tire and the strips are separated by cushion rubber 2 shown in Figs. 1, 2, 6 and 7 which is vulcanized to the fabric strips after the tire is completed. A layer of these strips is positioned as shown and then a second layer of strips 3 is positioned over the first layer and extend in the same direction, the second layer of strips covering the spaces between the first layer as shown in dotted lines in Fig. 1. After these two layers have been placed in position another layer of strips is laid over the first two layers and extend diagonally across the tread of the tire in the opposite direction, a second layer being positioned over this layer to cover the joints between the strips and the layers of fabric being separated by layers of rubber 2 as shown in Figs. 1, 2, 6 and 7. As shown in Fig. 6 the interior of the casing is formed of cushion rubber 4 and cord or fabric strips similar to those shown in Fig. 1 are embedded in this rubber as shown in Figs. 6 and 7.

Figure 3:
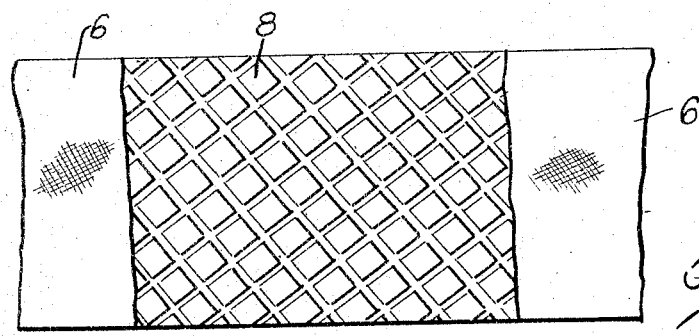
Fig. 3 is a plan view of one type of puncture proof strip partly broken away to show the cord or fabric base.

The simplest and cheapest form of puncture proof strip is shown in Fig. 3 in which a cord or fabric strip 6 is provided and a very tough flexible puncture proof composition 8 is pressed on opposite sides of the cord or fabric strip 6 and is then vulcanized to secure the composition to the strip and to toughen the composition, the composition being then sufficiently tough to resist puncture. The surface of the composition on opposite sides is provided with depressions as shown to give a better hold for the rubber of the tire which is vulcanized thereto after the casing is completed.

Another form of puncture proof strip is indicated in Figs. 4 and 5. In this form one or more layers of cords or fabric 7 are provided separated by alternate layers of rubber and a pliable puncture proof composition 14 similar to the composition 8 shown in Fig. 3 is pressed on opposite sides of the fabric strips 7 and contains the wires 13 which are coated with asbestos and rubber and are embedded in the composition 14, the wires 13 extending crosswise of the strips. The composition 14 is a vulcanizable composition and these strips are vulcanized to harden and toughen the composition 14 without decreasing the flexibility thereof, the vulcanizing process securing the composition 14 to the opposite sides of the cord or fabric strip 7 and securing the wires 13 in position therein. The composition may extend over a portion only of the strips 7 as shown in Fig. 6 to protect the tread of the casing or may be carried to the rim of the casing throughout the length of the fabric strips to protect the tire on all sides. These puncture proof strips are positioned in the casing in the same manner as the strips shown in Fig. 1, two layers of strips being wound diagonally so that the second layer of strips may cover the joints between the strips of the first layer. The different series of wires 13 extending across these puncture proof strips are arranged in staggered relation as shown in Fig. 5 so that an instrument tending to puncture the tire strikes the wires and is turned out of its course, the instrument being thus bent and turned back without entering the interior of the casing. After the puncture proof strips have been laid in position a series of strips of cord or fabric 1 and 3 shown in Figs. 1, 2, 6 and 7 are laid thereover and the tread 11 is put on, at which time the entire casing is vulcanized which secures the parts together and the rubber parts being vulcanized flexibly secure the several parts of the tire together. When the puncture proof strips are laid on diagonally of the tire the wires 13 extend diagonally to the tread of the tire but the wires are of small diameter and are sufficiently short due to the narrowness of the strips that they do not bend during movement of the tire over the ground and these wires are covered with rubber and asbestos and the composition in which they are embedded is sufficiently hard to hold the wires in place so that they cannot become loose in the puncture proof strips.

Figure 8:
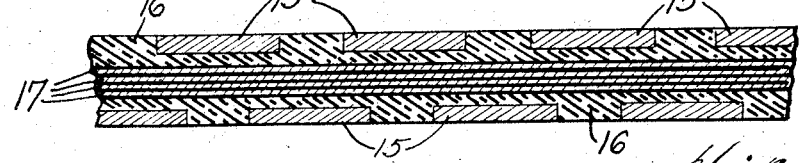
Fig. 8 is a section taken longitudinally of an alternative type of puncture proof strip.
Figure 9:
Fig. 9 is a plan view of the alternative type of strip.

In Figs. 8 and 9 an alternative form of construction is shown in which a series of puncture proof plates 15 are embedded in a rubber base 16 and the puncture proof plates protect the tread of the tire from being punctured. These puncture proof strips are formed of a series of layers of cords or fabric 17 separated by alternate layers of rubber and the rubber base 16 shown in Fig. 8 is formed on opposite sides of the fabric or cord strips 17 and the puncture proof plates 15 are inserted in the recesses 18 in the rubber base 16 as shown. The cord or fabric strip 17 in the puncture proof strips is carried around to the base of the tire and holds the puncture proof portion in position between the interior of the casing and the tread. These puncture proof strips are laid in position in the same manner as the strips shown in Fig. 1 and one series of strips covers the joints between the other series of strips. These puncture proof strips are also embedded in the rubber and the strips 1 and 3 are laid thereover as shown in Figs. 6 and 7. When the casing has been thus built up it is enclosed within the rubber tread 11 containing the cable bases 12 and the casing is then vulcanized to secure the parts together in the rubber. The plates 15 which are embedded in the puncture proof strips are formed from a vulcanizable composition similar to the puncture proof composition 8 and are hardened and toughened by vulcanizing before being embedded in the strips. As will be seen from Fig. 8 the plates 15 on opposite sides of the strip are arranged in staggered relation so that the plates on one side are positioned opposite the spaces between the plates on the opposite side and thus prevent the possibility of a puncturing instrument passing through these puncture proof strips. If desired wires may be embedded in these plates similar to the wires 13 in Fig. 5 but if the plates are correctly vulcanized this is not necessary.

By this construction each cord or fabric strip 1 and 3 is surrounded with rubber so that when vulcanized the strips may give or yield slightly in relation to each other which will stretch the surrounding rubber base slightly but will not produce friction between the different parts. The puncture proof strips are also completely surrounded with rubber which when vulcanized allows movement of these strips in relation to each other without any deleterious effect. In this manner a casing is formed which will readily give to any type of road shock but which will not produce interior heat by friction and thus the life of the tire is lengthened and the tire cannot be readily punctured due to the puncture proof strips embodied therein. By thus preventing internal heat and friction and increasing the elasticity of the tire the possibility of blowouts is greatly reduced if not prevented.

The structure of a tire disclosed in this application differs from that disclosed in my co-pending application Serial No. 630,231 particularly in the manner in which the puncture resisting elements are arranged relative to the fabric.

From the foregoing description it becomes evident that the device is very simple and efficient in operation, is puncture proof and at the same time is more flexible and resilient than the usual tire and provides a tire structure which accomplishes the objects described.

Having thus fully described my invention its utility and mode of operation what I claim and desire to secure by Letters Patent of the United States is—

1. A tire structure comprising several layers of cord or fabric strips extending diagonally across the tread of the tire from rim to rim, each cord or fabric strip being separately embedded in rubber and spaced from adjacent strips by an intervening wall of rubber, a series of flexible puncture proof strips comprising a cord or fabric base having a rubber surfacing on opposite sides, a series of flexible puncture proof plates of a vulcanizable composition embedded in the rubber of the puncture proof strips, the plates on the one side of the strip being opposite the spaces between the plates on the opposite side of the strip and a rubber tread for the tire, the tire being vulcanized to yieldably secure the several parts together.

2. A tire structure comprising several layers of cord or fabric strips extending diagonally across the tread of the tire and separately embedded in rubber, a series of puncture proof strips having a rubber covering, a series of plates of a vulcanized composition embedded in the rubber of the puncture proof strips and a rubber tread for the tire, the tire being vulcanized to secure the several parts together.

3. A tire structure comprising a series of cord or fabric strips extending diagonally across the tread of the tire and separately embedded in rubber, a second series of cord or fabric strips separately embedded in rubber and covering the joints between the strips of the first series, a third series of cord or fabric strips separately embedded in rubber and extending diagonally across the tread of the tire at an angle to the first and second series, a fourth series of cord or fabric strips separately embedded in rubber covering the joints between the strips of third series, a series of flexible puncture proof strips of a vulcanizable composition separately embedded in rubber and extending diagonally across the tread of the tire, a second series of flexible puncture proof strips covering the joints between the puncture proof strips of the first series and a rubber tread for the tire, the tire being vulcanized to allow yieldable movement of the strips in relation to each other.

4. A tire structure comprising a series of cord or fabric strips extending diagonally across the tread of the tire and separately embedded in rubber, a second series of cord or fabric strips covering the joints between the strips of the first series separately embedded in rubber so that the strips are separated on all sides by an intervening wall rubber, a third series of cord or fabric strips separately embedded in rubber and extending diagonally across the tread of the tire at an angle to the first and second series, a fourth series of strips separately embedded in rubber covering the joints between the strips of the third series, and a rubber tread covering the cord or fabric strips, the tire being vulcanized to yieldably secure the several parts together.

5. A tire structure comprising several layers of cord or fabric strips extending diagonally across the tread of the tire, each cord or fabric strip being separately embedded in rubber and spaced from adjacent strips by an intervening wall of rubber, a series of flexible vulcanizable puncture proof strips extending diagonally across the tread of the tire and separately embedded in rubber, the second series of puncture proof strips covering the joints between the strips of the first series and a tread for the casing thus formed, the tire being vulcanized to yieldably secure the several parts together.

6. A tire structure comprising several layers of cord or fabric strips extending diagonally across the tread of the tire, each cord or fabric strip being separately embedded in rubber and spaced from the adjacent strips by an intervening wall of rubber, a series of puncture proof strips of a vulcanized composition extending diagonally across the tread of the tire, the puncture proof strips being separately embedded in rubber, a series of short wires covered with rubber and asbestos and embedded in the composition of the puncture proof strips and a rubber tread for the tire, the tire being vulcanized to yieldably secure the several parts together.

7. A tire structure comprising several layers of cord or fabric strips extending diagonally across the tread of the tire, each cord or fabric strip being separately embedded in rubber, a series of flexible puncture proof strips of a vulcanized composition extending diagonally across the tread of the tire and being encased in rubber, a series of short wires embedded in the composition of the puncture proof strips and extending cross-wise of the strips and a rubber tread for the tire, the tire being vulcanized to allow yieldable movement of the strips in relation to each other.

In testimony whereof I sign this specification.

AMEL B. BROLUSKA.